(12) United States Patent
Noda et al.

(10) Patent No.: US 6,940,526 B2
(45) Date of Patent: Sep. 6, 2005

(54) IMAGE SYNTHESIZING APPARATUS

(75) Inventors: Shinji Noda, Tokyo (JP); Naoki Kusunoki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 233 days.

(21) Appl. No.: 09/883,225

(22) Filed: Jun. 19, 2001

(65) Prior Publication Data

US 2002/0030634 A1 Mar. 14, 2002

(30) Foreign Application Priority Data

Jun. 19, 2000 (JP) ........................................ 2000-182829

(51) Int. Cl.⁷ ................................................ G09G 5/00
(52) U.S. Cl. ...................... 345/629; 345/620; 345/622; 345/624; 345/660; 345/661
(58) Field of Search ................................ 345/620, 622, 345/624, 629, 660, 661, 666, 641, 625, 619, 628; 348/239, 333.05, 333.11, 333.12, 584, 586; 358/538, 1.2; 382/282, 284, 309

(56) References Cited

U.S. PATENT DOCUMENTS

| | | | | |
|---|---|---|---|---|
| 6,222,637 B1 * | 4/2001 | Ito et al. | .................. | 382/284 X |
| 6,259,457 B1 * | 7/2001 | Davies et al. | ................ | 345/629 |
| 6,282,330 B1 * | 8/2001 | Yokota et al. | .............. | 382/309 |
| 6,473,094 B1 * | 10/2002 | Sheasby et al. | ............. | 345/629 |
| 6,654,506 B1 * | 11/2003 | Luo et al. | .................... | 345/620 |

OTHER PUBLICATIONS

Perlin, K. & Fox, D., "Pad An Alternative Approach to the Computer Interface", Courant Institute of Mathematical Sciences, ACM, 1993,pp. 57–64.*
Bederson, B. & Hollan, J., "Pad++: A Zooming Graphical Interface for Exploring Alternate Interface Physics", ACM, Nov. 1994, pp. 17–26. □□*
Mackinlay, J. et al., "Developing Calendar Visualizers for the Information Visualizer", ACM, Nov. 1994, pp. 109–118.*

* cited by examiner

*Primary Examiner*—Sumati Lefkowitz
*Assistant Examiner*—Chante Harrison
(74) *Attorney, Agent, or Firm*—Sughrue Mion, PLLC

(57) ABSTRACT

There is disclosed an image synthesizing apparatus for producing a synthetic image that consists of a background image and at least a main image superimposed on the background image. An input image is displayed in a main display area of a control screen, whereas an outer frame and at least an inner frame are displayed in a sub display area of the control screen in accordance with a selected template. First a crop boundary having a similar shape to the outer frame is displayed on the image in the main display section. The crop boundary is movable on the image and changeable in size. After pasting a cropped area of the image as the background image in the outer frame, a second image is selected and displayed in the main display area. Then, a crop boundary having a similar shape to the inner frame is displayed on the second image, so a cropped area of the second image is pasted in the inner frame, to be printed as the main image.

22 Claims, 16 Drawing Sheets

SUPERIMPOSE A2 HORIZONTAL

SUPERIMPOSE A4 VERTICAL

SUPERIMPOSE OBLONG A4 HORIZONTAL

MULTI-SUPERIMPOSE A4 HORIZONTAL

IMAGE SYNTHESIZING APPARATUS

BACKGROUND OF THE INVENTION

1. Field of the Invention

The present invention relates to an image synthesizing apparatus for synthesizing a plurality of images, using a template having an outer frame for pasting a background image therein and at least an inner frame for pasting a main image therein.

2. Background Arts

An imaging system has been known in the art, wherein electronic images are taken out from different kinds of storage media, and are processed for correcting the image quality or for synthesizing with an optional template image, to print out hard copies of the electronic images. The imaging system consists of image input devices, a computer and a printer. As the image input devices, there are a reflective scanner that reads out electronic images from reflective originals, such as a photo-print printed on photographic paper and other kinds of printed matters printed on reflective recording material, a film scanner that reads out electronic images from negative or positive film, and a card reader that reads out digital image data from a storage card. The digital image data is picked up through an electronic still camera, called a digital still camera. The computer processes the image data from the image input device, and the printer prints out hard copies based on the processed image data.

As for the conventional imaging system, versatile image processing software is installed in a personal computer, for controlling respective components according to the image processing software. When, for example, an image read out from a reflective original through a reflective scanner is to be synthesized with an image photographed by a digital still camera, the image data of the reflective original and the image data supplied from the digital still camera must be previously stored in the personal computer in the conventional imaging system, and thereafter the imaging software is started up to open the image read out through the reflective scanner and the image from the digital still camera separately from each other. Then, a cropping area is designated in one of these images, and is copied and pasted in an appropriate position on the other image.

Accordingly, it takes a lot of complicated operations and a certain time to get an expected synthetic image in the conventional imaging system, though it is capable of executing a lot of functions. Beside that, since the crop boundary is variable in shape as well as in size from a pasting frame in which the cropped image is to be pasted, regardless of whether it is expected or not, it has been difficult to match the shape of the cropping area to the shape of the pasting frame.

SUMMARY OF THE INVENTION

In view of the foregoing, an object of the present invention is to provide an image synthesizing method and an apparatus therefor, that facilitate synthesizing a plurality of images in a superimposed fashion.

An image synthesizing apparatus for producing a synthetic image from at least first and second images, wherein the synthetic image consists of a background image and at least a main image superimposed on the back ground image, the apparatus comprising:

a first display section for displaying the at least first and second images one by one when each of the images is selected from among images input in the image synthesizing apparatus;

a second display section for displaying an outer frame and at least an inner frame located inside the outer frame;

a frame selecting device for selecting one of the outer and inner frames as displayed in the second display section;

a crop boundary displayed on the image in the first display section, the crop boundary having a similar shape to the frame that is selected by the frame selecting device;

a frame modifying device for modifying any of the outer and inner frames by homothetically changing size or position of the crop boundary relative to the image displayed in the first display section; and a cropping and pasting device for cropping those areas of the first and second images that are each individually bounded by the crop boundary, and pasting the cropped area of the first image as the background image in the outer frame, and the cropped area of the second image as the main image in the inner frame.

According to the configuration of the present invention, the images are synthesized with each other just by inputting and displaying the images one by one while pasting a cropped area of the individual input image in a corresponding frame. Since the crop boundary has a similar shape to the corresponding frame, and may be homothetically enlarged or reduced, it becomes easy and efficient to crop an appropriate area.

By providing a device for changing the aspect ratio of any of the outer and inner frame, the variation of layout is widened.

According to a preferred embodiment, where the synthetic image is to have a plurality of main images which overlap with each other, data designating an order of displaying a plurality of inner frames from the front of the synthetic image is allocated to each inner frame. Thereby, the synthetic image may be reproduced repeatedly while maintaining the main images in the designated order of arrangement from the front. The order of arrangement of the inner frames from the front may be modified appropriately even after the images are pasted therein.

By storing the synthetic image as a set of an image pasted in the outer frame, an image pasted in the inner frame, and location data representative of position of the inner frame relative to the outer frame, it becomes possible to change the position or size of any of the inner and outer frames each individually and repeatedly, even after the synthetic image is once stored.

By storing the synthetic image as a single image data file, it becomes possible to store the synthetic image at a reduced data number in a reduced data size, facilitating interchanging the image data with another imaging device.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
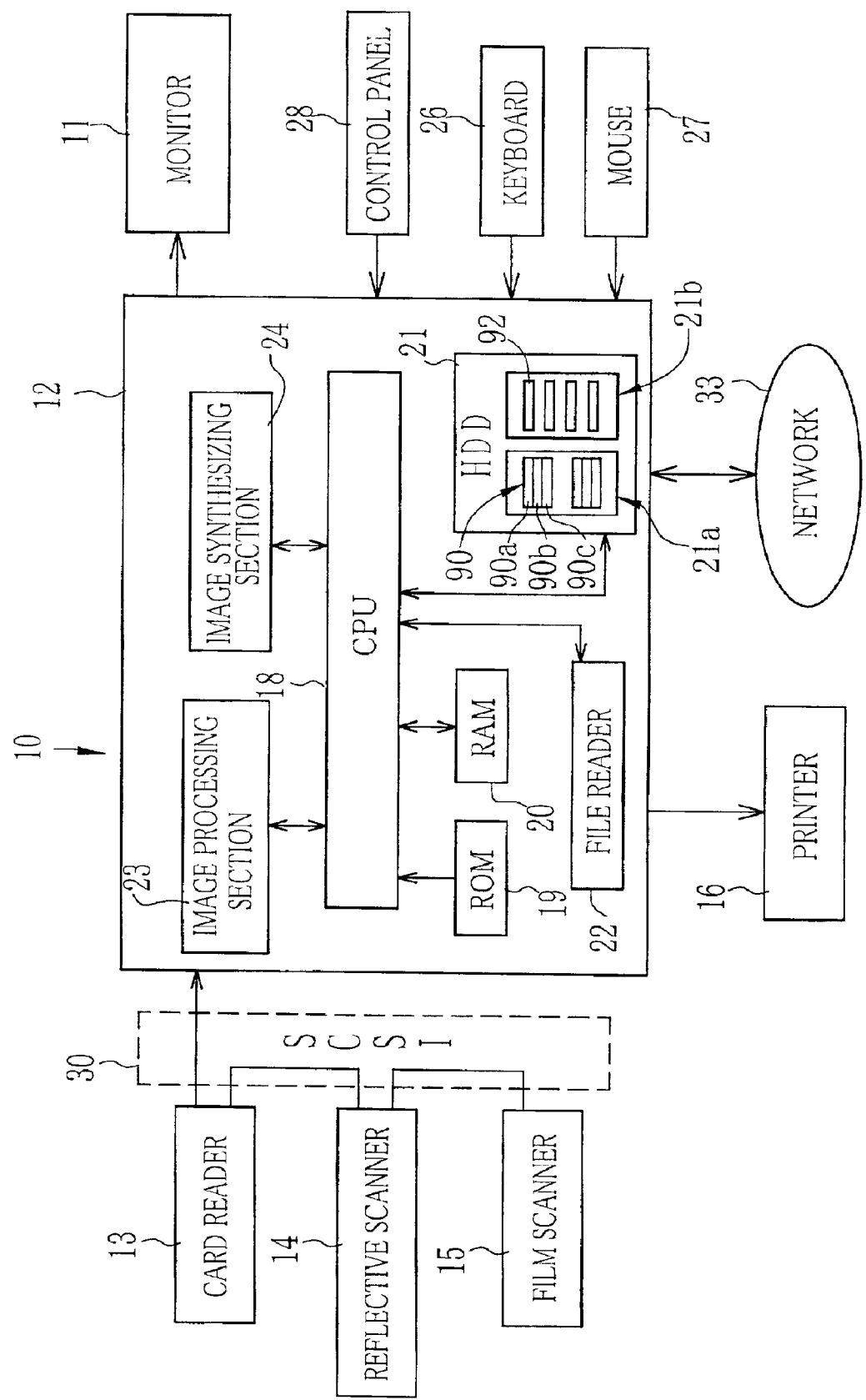
FIG. 1 is a block diagram illustrating an imaging system according to an embodiment of the present invention.

In FIG. 1, an imaging system 10 is mainly constituted of a personal computer 12, a monitor 11 as a display device, and a card reader 13, a reflective scanner 14 and a film scanner 15 as image input devices, and a printer 16. The monitor 11, the image input devices 13 to 15 and the printer 16 are connected to the personal computer 12. The printer 16 prints out hard copies of images processed in the personal computer 12. In this embodiment, the printer 16 is of a type that uses a heat-developing photosensitive recording material.

The personal computer 12 consists of a CPU 18, a ROM 19, a RAM 20, a hard disc drive (HDD) 21, a file reader 22, an image processing section 23 and an image synthesizing section 24. For example, the file reader 22 is a floppy disc drive, and may read out image data from a floppy disc. In that case, the file reader 22 is used as an image input device.

The HDD 21 is provided with a data storage section for storing any kind of data besides a program storage section where various programs are stored. The data storage section includes a batch processing holder 21a for temporary storage of produced image data before a plurality of images being printed in succession afterward, and a shared holder 21b that is accessible to other imaging systems through a network. The file reader 22 and the data storage section of the HDD 21 are used as image output sections.

A keyboard 26, a mouse 27 and a control panel 28 are also connected to the personal computer 12. The keyboard 26 is used for installing software-programs in the personal computer 12, setting up various parameters in the personal computer 12, or for maintenance. The control panel 28 is provided with operation buttons specific for controlling the imaging system 10, so the mouse 27 and the control panel 28 are used for imaging and processing.

The card reader 13, the reflective scanner 14 and the film scanner 15 are connected in cascade to the personal computer 12 through a SCSI interface 30 that is provided in the personal computer 12. The card reader 13 may read out image data from a storage card as it is put in the card reader 13. In this embodiment, the image data is assumed to be picked up and recorded on the storage card by an electronic still camera that may be called a digital still camera.

The reflective scanner 14 is for reading out electronic images from reflective originals, such as photo-prints, instant photographs recorded on self-developing type photo film sheet, and printed matters. For example, the reflective scanner 14 is a flat-head type that scans a line sensor across a reflective original as placed on a reading stage, to read out an image from the entire surface of the reflective original. The film scanner 15 is for reading out an image from a light-permeable material, such as negative or positive photo film. When the image is read out from the negative, the film scanner 15 converts it into a positive image before inputting it in the personal computer 12.

The personal computer 12 is connected to a network 33, such as a LAN (Local Area Network) or the Internet. Through the network 33, the imaging system 10 can share the same data with and cooperate with other imaging systems installed in a photo-lab, or receive image data from a client. On communicating image data through the Internet, the image data is converted into a ciphered code, so that the image data may be accessible only for particular persons. In ciphering, accessible ranges are classified in a pyramid style, so that the right to access is given to those belonging to upper classes than a designated class.

The image data input through the respective image input devices 13 to 15 is sent to the image processing section 23. The image processing section 23 consists of a color correction circuit and a gradation processing circuit. The color correction circuit controls the color balance of the input image, taking different spectral characteristics between these image input devices 13 to 15 into consideration. Concretely, the color correction circuit carries out γ-correction on red, green and blue (RGB) color signals of the image data with use of coefficients that are predetermined for the respective image input devices 13 to 15. The gradation processing circuit corrects gradation of the image data by use of one of a plurality of look-up tables (LUT) which are prepared for the respective image input devices 13 to 15, such that the gradation is well reproduced by the printer 16 of the imaging system 10.

Since the different kinds of reflective originals, including photo-prints, printed matters and instant photographs, use different color materials, more than one LUT is prepared for the reflective scanner 14, each LUT being prepared for one type of the color materials. By designating the kind of the reflective original the reflective scanner 14 is going to scan, one of the LUTs that is suitable for the color material used in the designated original is used for the gradation correction. Also for the film scanner 15, two types of LUTs are prepared: one for the negative film and the other for the positive film.

The reflective scanner 14 and the film scanner 15 are provided with a pre-scan mode of a low resolution and a fine scan mode of a high resolution. The reflective scanner 14 or the film scanner 15 operates in the pre-scan mode to input image data in the personal computer 12 for the sake of displaying an image on the monitor 11. The fine scan mode is to input image data for the sake of synthesizing or printing an image. In the pre-scan mode, the image processing section 23 corrects color and gradation of the input image data, and the results of correction are reflected by the image displayed on the monitor 11. In the fine scan mode, correction parameters applied to the image data during the pre-scan mode are transferred to an image data converter built in the reflective scanner 14 or to an image data converter built in the film scanner 15, so the γ-conversion and the gradation correction of the image data is performed in the reflective scanner 14 or in the film scanner 15 on the basis of the correction parameters. That is, the image data bypasses the image processing section 23 of the personal computer 12, when it is written on the RAM 20 in the fine scan mode.

Also in the fine scan mode, the CPU 18 automatically adjusts the scanning resolution of the reflective scanner 14 or that of the film scanner 15 so as to make the image resolution in a printing area of a designated recording paper size equal to a predetermined output resolution of the printer 16. For example, where an original image is L size and a hard copy is to be printed in the entire printing area of a 2L size recording paper, and the output resolution of the printer 16 is 400 dpi, the image is to be enlarged to 200%. Then, the CPU 18 automatically sets the resolution of the scanner 14 or 15 at 800 dpi for the fine scanning, thereby to equalize the image resolution to the printing resolution.

The image synthesizing section 24 performs a variety of image processing operations, like magnification changing of a selected image, cropping and synthesizing with a template or other input images.

Figure 2:
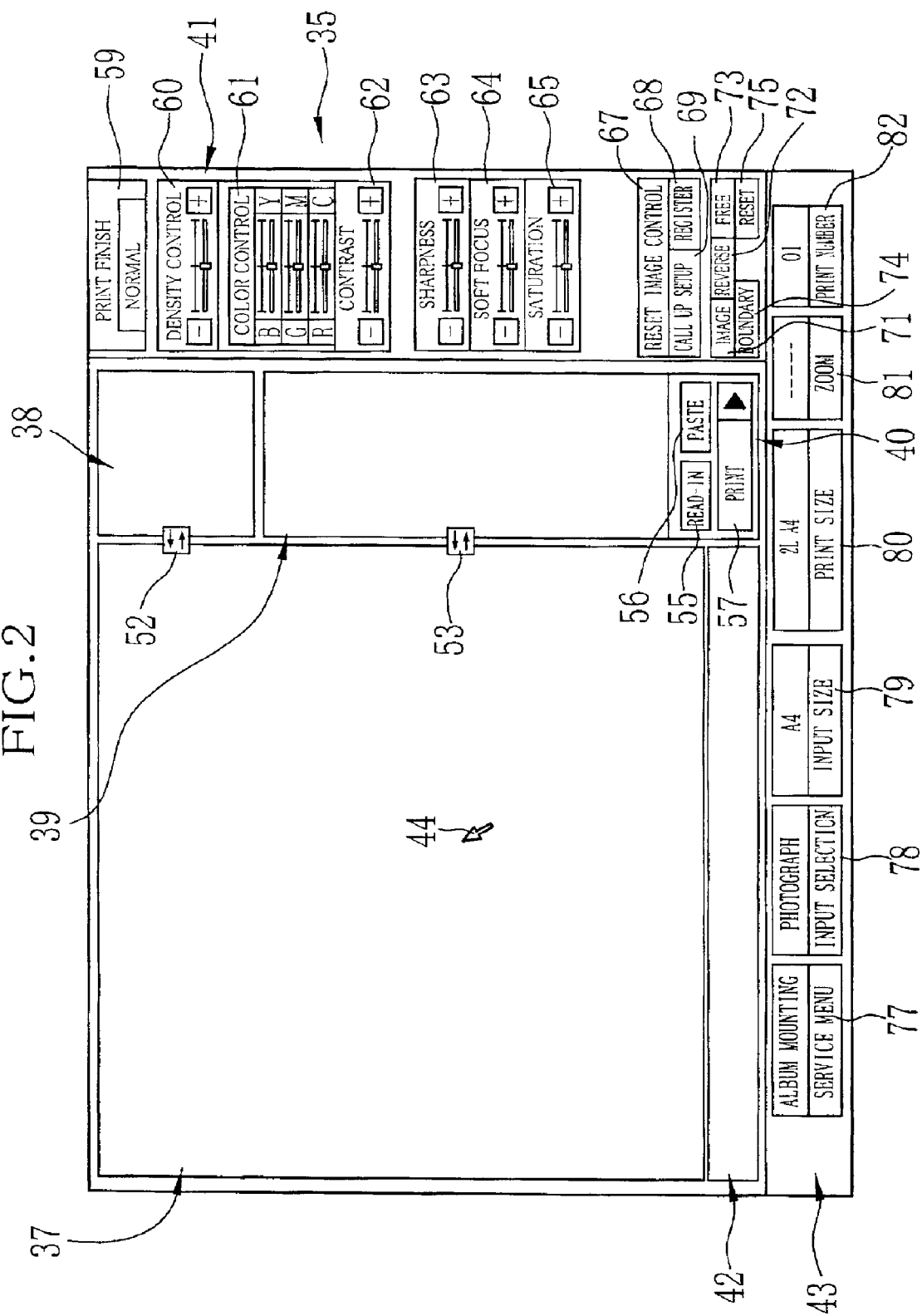
FIG. 2 is an explanatory diagram illustrating a control screen for image processing, that is displayed on a monitor of the imaging system, in a condition at the start of operation of the imaging system.

Image processing software specific for the imaging system 10 is installed in the personal computer 12, for permitting processing and synthesizing image data. The image processing section 23 and the image synthesizing section 24 are activated by starting up the image processing software. When the image processing software is started up, a corresponding control screen 35 appears on the monitor 11, as shown in FIG. 2, so the operator of the imaging system may operate functional buttons on the control screen 35 by use of the mouse 27 or the control panel 28, to work the imaging system 10.

The control screen 35 of the image processing software is of a fixed multi-window type that adopts Graphical User Interface (GUI) in a number of working areas whose positions and sizes are fixed. The control screen 35 consists of a largest main display area 37, first and second sub display areas 38 and 39 and a main control command display area 40 which are located on the right side of the main display area 37, an image quality control area 41 on the right side of these areas 38 to 40, a message display area 42 and a menu selection display area 43 which are located on the bottom of the control screen 35. A pointer 44 is also displayed on the control screen 35. The pointer 44 is movable through the mouse 27 or the control panel 28.

Figure 3:
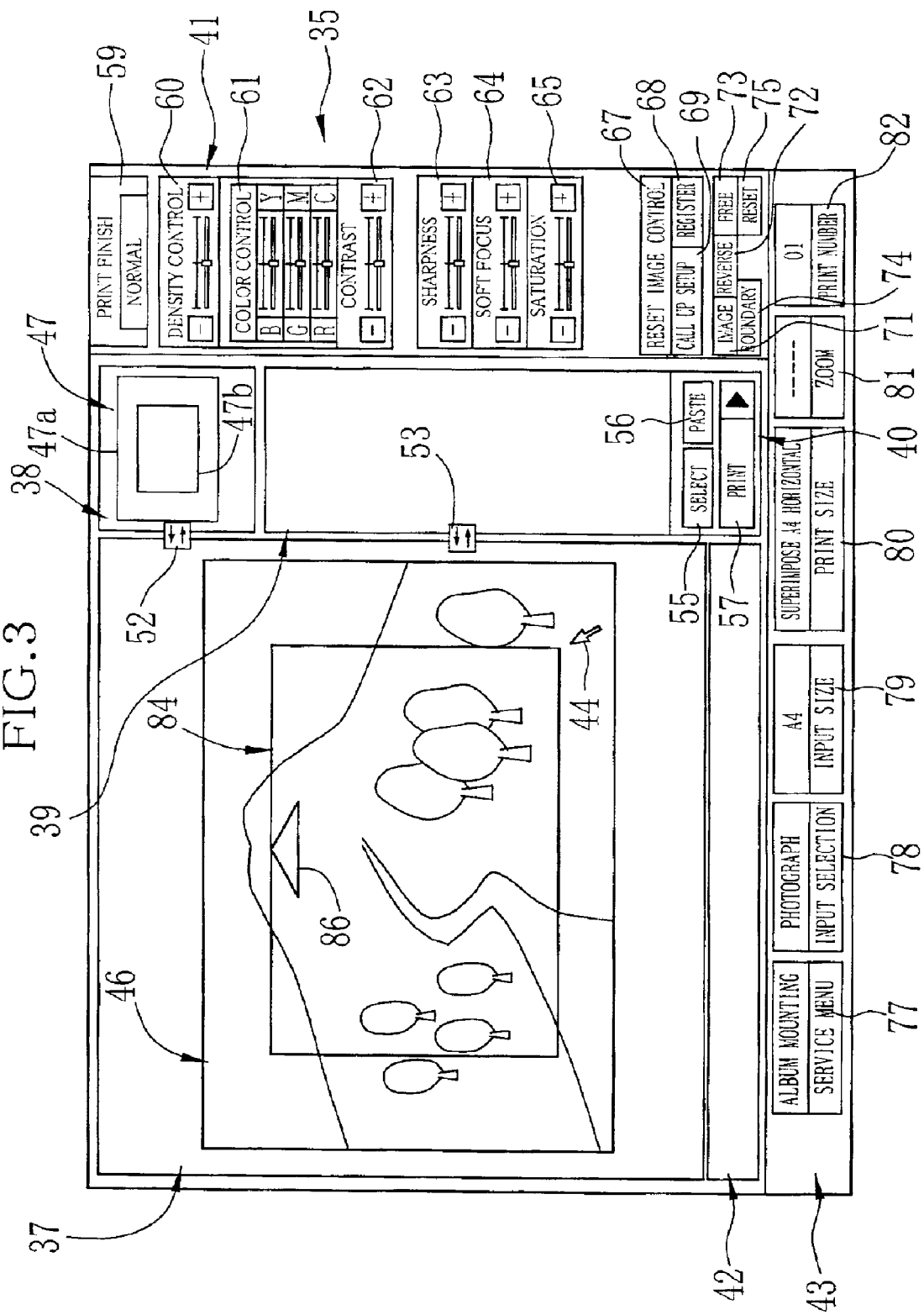
FIG. 3 is an explanatory diagram illustrating an example of display condition on the control screen, when a first image to synthesize is entered.

As shown in FIG. 3, the main display area 37 is an input image display area where an image 46 to synthesize is displayed in a large size, that is selected from among a plurality of images input through the respective image input devices. When more than one image is to be synthesized with each other to produce a synthetic image, the images to synthesize are displayed one by one on the main display area 37.

Figure 4:
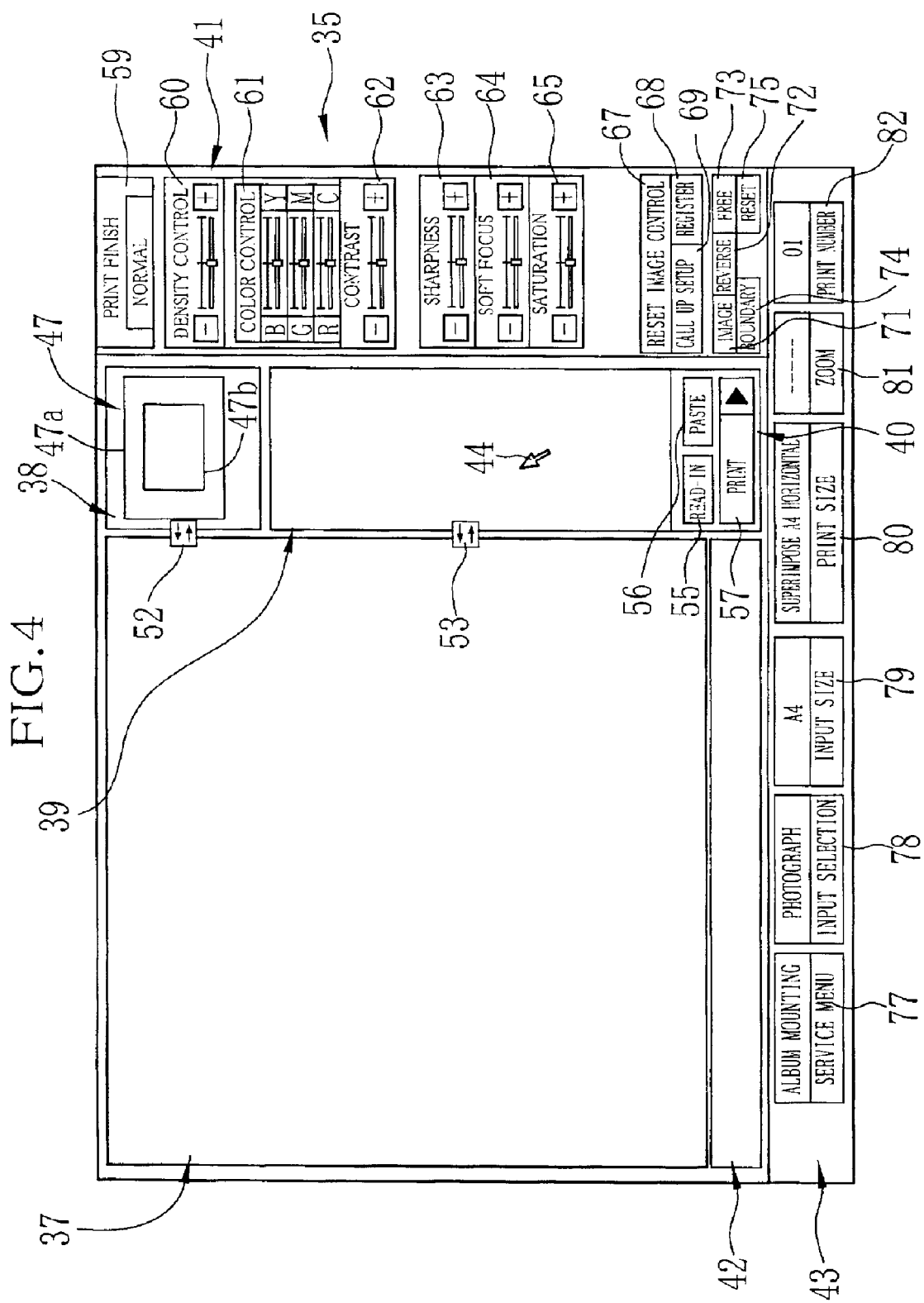
FIG. 4 is an explanatory diagram illustrating an example of display condition on the control screen, when a template is selected.

The first sub display area 38 is a print preview area for displaying an image simulating a printed condition in a reduced size. When a number of images are to be synthesized with each other to produce a synthetic image, the image synthesizing process is successively displayed on the first sub display area 38. So the first sub display area 38 doubles as an edited image display area. At the first stage of image synthesizing, a template is selected, and a framing image corresponding to the selected template is displayed on the first sub display area 38, as shown for example in FIGS. 3 and 4. The framing image consists of an outer frame representative of an outline of a recording paper sheet, and at least an inner frame that is arranged in correspondence with the selected template. The image 46 displayed in the main display area 37 may be pasted in the framing image 47 in a manner as set forth in detail later.

In the illustrated example, the framing image 47 consists of an outer frame 47a whose size is equal to or slightly smaller than a recording sheet size, and an inner frame 47b located inside the outer frame 47a. The framing image 47 may be selected from among a variety of options wherein the outer frames have different aspect ratios, and the number of the inner frames as well as the size and arrangement of the inner frames are different from each other.

Figure 5:
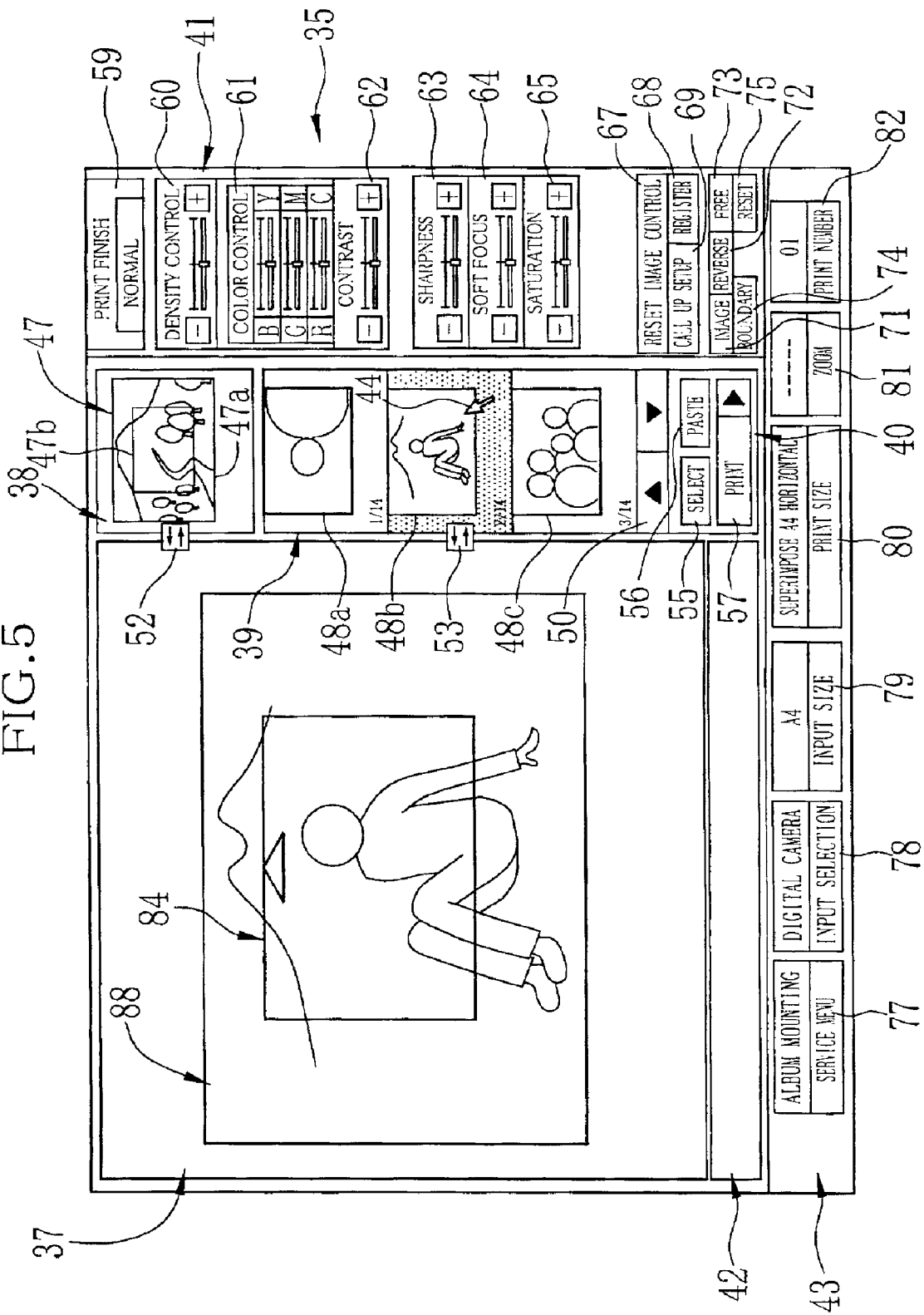
FIG. 5 is an explanatory diagram illustrating an example of display condition on the control screen, when a second image to synthesize is entered.

As shown in FIG. 5, the second sub display area 39 is a thumbnail display area where a number of thumbnails of images may be displayed when image data of those images is read in the personal computer 12. Three vertically arranged thumbnails 48a, 48b and 48c are displayed at a time in this embodiment. Any of the thumbnails 48a to 48c displayed on the second sub display area 39 may be selected to be synthesized, and the image corresponding to the selected thumbnail is displayed on the main display area 37. When a thumbnail is selected, the periphery of the selected thumbnail is displayed in the reversed color, to make apparent to the operator which of the thumbnails is presently selected.

Because the reflective scanner 14 or the film scanner 15 usually reads out a single original image at a time, the image read out through the reflective scanner 14 may be regarded as the image 46 to synthesize, and automatically displayed in the large size on the main display area 37.

As a storage card usually stores image data of more than three image frames, there is a need for displaying more than three images as input images on the second sub display area 39. In that case, a pair of scroll buttons 50 are displayed on the bottom of the second sub display area 39, to permit scrolling the thumbnails up and down and thereby displaying all of the input images in turns. If the image to read out from the storage card is previously determined, it is possible to designate that image to read out only image data of the designated image from the storage card, and display the designated image directly on the main display area 37.

A first display interchange button 52 is provided on a border between the main display area 37 and the first sub display area 38, and a second display interchange button 53 is provided on a border between the main display area 37 and the second sub display area 39. When the first display interchange button 52 is operated, then the image 46 that has been displayed in the main display area 37 is displayed in a reduced size in the first sub display area 38, and the image that has been displayed in the first sub display area 38 is displayed in an enlarged size in the main display area 37. In the same way, if the second display interchange button 53 is operated, the displayed contents are interchanged between the main display area 37 and the second sub display area 39. At that time, six of the thumbnails may be displayed at once on the main display area 37, making full use of the large main display area 37. If there are more than six thumbnails, a pair of page scrolling buttons may be displayed on the bottom side of the main display area 37, so that the operator may view all the thumbnails successively on the main display area 37.

With the first and second display interchange buttons 52 and 53, the small images displayed on the first or the second sub display area 38 or 39 can be quickly displayed in an enlarged size on the main display area 37, so these buttons 52 and 53 are very convenient for the sake of confirming the detail of the small images.

The main control command display area 40 displays a read-in button 55, a pasting button 56 and a print button 57. By clicking on the read-in button 55, image data is read out through the card reader 13, or the reflective scanner 14, or the film scanner 15. The read-in button 55 doubles as a selection button, and servers as the selection button if any image is read in the personal computer 12, and is used for selecting the image to synthesize from among the thumbnails 48a to 48c displayed on the second sub display area 39. In that case, an indicia "SELECT" is displayed on this button 55 instead of "READ-IN".

Figure 6:
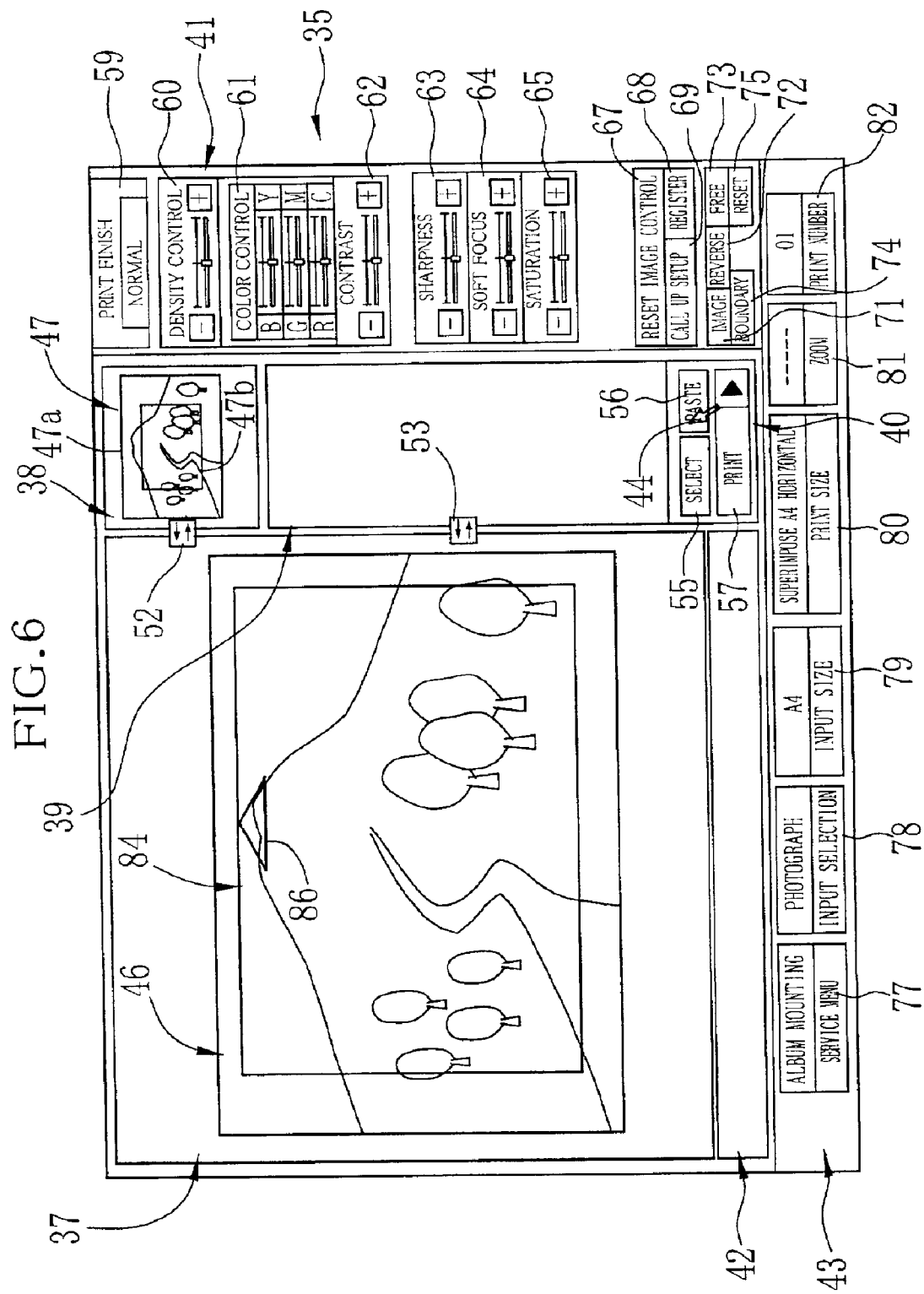
FIG. 6 is an explanatory diagram illustrating an example of display condition on the control screen, when an area of the first image to synthesize is cropped and pasted in an outer frame.

As shown in FIG. 6, the pasting button 56 is operated to paste the selected image 46 in the framing image 47 as displayed on the first sub display area 38. In that case, the selected image is pasted as a whole, or after being cropped. The print button 57 is operated to activate the printer 16 to print an image based on the image data as processed for quality control or image synthesizing or the like.

The image quality control area 41 displays control buttons or sliders for manual image quality control, including a print finish designation button 59, a density control slider 60, a color control slider 61, a contrast control slider 62, a sharpness control slider 63, a soft focus effect control slider 64, and a saturation control slider 65. The control buttons are operated by clicking the pointer 44 thereon, whereas the sliders are operated by dragging their knobs to an appropriate position through the mouse 27.

Provided below the image quality control area 41 are a reset button 67 for resetting the previous setup values for the image quality control, a register button 68 for registering setup values for the image quality control, and a call up button 69 for calling up registered setup values. The call up button 69 allows to use the setup values for the image quality control repeatedly after once they are setup, and thus improves work efficiency.

Below these buttons for the image quality control, there are provided an image turning button 71 for turning the image through an angle of 90 degrees on the main display area 37, an image reverse button 72 for reversing the image on the main display area 37 left-to-right, a free cropping button 73 for changing aspect ratio of a crop boundary, a boundary turning button 74 for turning the direction of the crop boundary through 90 degrees, and a reset button 75 for canceling designation of a cropping area by the crop boundary.

Figure 7:
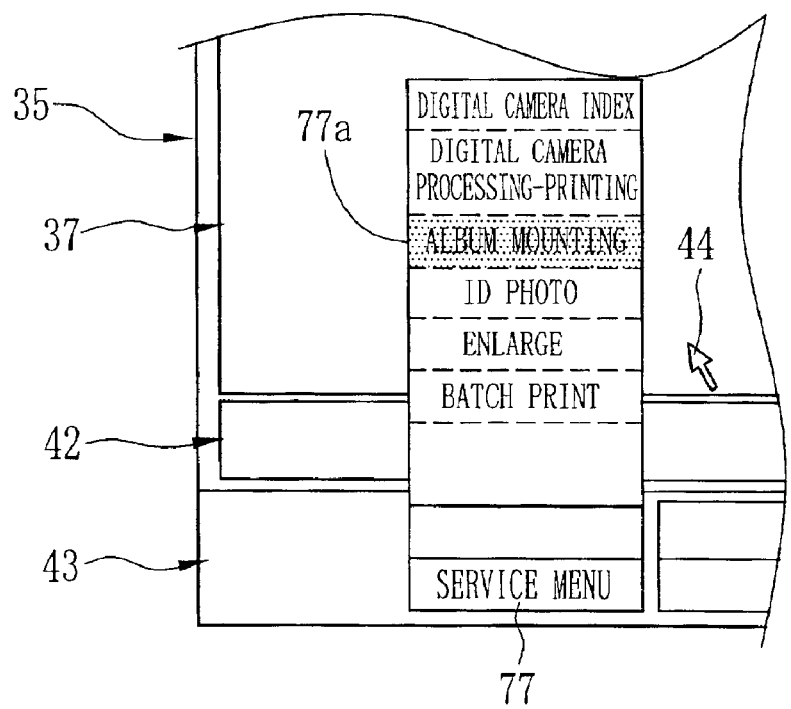
FIG. 7 is an explanatory diagram illustrating a menu list displayed for selecting a service menu on the control screen.

The menu selection display area 43 displays a service menu button 77, an input selection button 78, an input size button 79, a print size button 80, a zoom button 81 and a print number button 82. As shown for example in FIG. 7, a menu option list 77a pops up from the service menu button 77 upon clicking on the service menu button 77. By clicking on one of the menu options, the image processing software is switched to a job mode corresponding to the selected menu option. As exemplars of job modes selectable by the service menu button 77, the present embodiment offers a digital camera index mode, a digital camera processing-printing mode, an album mounting mode, an ID photo mode, and a batch printing mode.

The digital camera index mode is selected to produce an index print, wherein all of images which are recorded on a storage card and read out through the card reader 13 are printed on a sheet of recording paper, after being reduced in size and arranged in a matrix. Different kinds of templates are prepared for this mode, and is selected according to the number of images to be contained in an index print.

The digital camera processing-printing mode is selected when it is necessary to print out hard copies of the processed image data immediately after the image data picked up through a digital still camera is processed. In this mode, a template with four frames is used for a A4 size recording sheet, and a template with two frames is used for a A5 size recording sheet.

The album mounting mode is for printing a plurality of images on a recording sheet in appropriate layout and arrangement, just like the mounting on an album. So a file of these recording sheets serves directly as an album. Also for this mode, some templates are prepared. For example, there are a template for arranging four images of the same size on one sheet, a template for arranging one large image and two smaller images on one sheet, and a template for arranging a couple of large images on one sheet.

In the ID photo mode, ID photographs for many kinds of official application papers may be produced. For the ID photo mode, a variety of templates, including those for the driver's license and for the passport, are previously stored.

The batch printing mode is for printing a plurality of images on the basis of image data for the batch processing that has been stored in the batch processing holder 21a of the HDD 21.

The input selection button 78 is operated to select the input device for inputting the image data and also to designate the sort of the original. A list of selectable input devices and different sorts of originals pops up from the input selection button 78 upon clicking on the input selection button 78. As the selectable input devices, those connected to the imaging system 10 are listed up, i.e. the card reader 13, the reflective scanner 14, the film scanner 15 and the file reader 22 in the present embodiment. As the selectable sorts of originals, a photo-print, a printed matter, an instant photograph, a negative photo film, a positive photo film, and so forth are displayed. When one sort of the originals is selected by the input selection button 78, a suitable image input device for this sort of original is automatically selected. For example, if the photo-print or the printed matter is selected, the reflective scanner 14 is automatically selected as the image input device. If the negative film or the positive film is selected, the film scanner 15 is automatically selected.

Then, the color correction circuit and the gradation correction circuit of the image processing section 23 carry out proper corrections on the input image data, taking the properties of the used image input device and the sort of the original into consideration. It is possible for the operator to register other kinds of originals and image input devices.

The input size button 79 is used for entering the size of an original when the original is to be scanned through the reflective scanner 14. A list of size options for the original pops up from the input size button 79 upon clicking on this button 79, so the operator may select the size of the original. Then, the reflective scanner 14 scans a range determined by the selected size of the original.

The print size button 80 is operated for selecting the sheet size of recording paper for printing, or for selecting a template. Upon clicking on the print size button 80, a list 80a of paper size options and template options pops up from this button 80, as shown for example in FIG. 8.

Since there are a large number of templates stored in the imaging system 10, the template options in the popping up list 80a from the print size button 80 is switched over according to the job mode selected by the service menu button 77. For example, those templates having a lot of frames and usable for the index printing are listed up in the digital camera index mode, whereas those templates for the driver's license, the passport and other kinds of ID papers are listed up in the ID photo mode.

Figure 8:
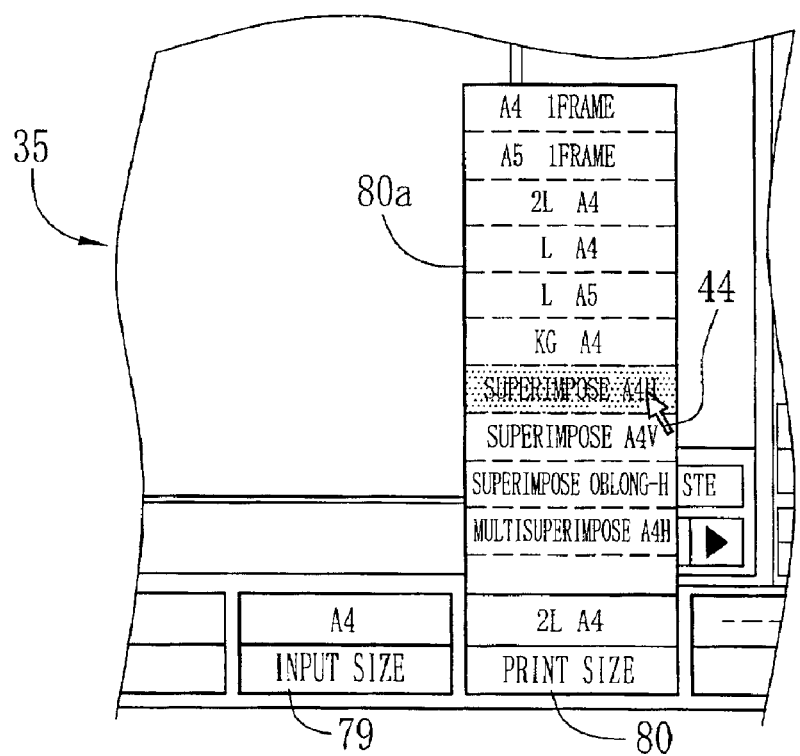
FIG. 8 is an explanatory diagram illustrating a template list displayed for selecting a template on the control screen.

FIG. 8 shows the paper size and template options included in the template list 80a popping up from the print size button 80 in the album mounting mode, which are "A4 1 Frame" "A5 1 Frame", "2L A4", "L A4", "L A5", "KG A4", "Superimpose A4 Horizontal", "Superimpose A4 Vertical", "Superimpose Oblong A4 Horizontal" and "Multi-superimpose A4 Horizontal".

Figure 9A:
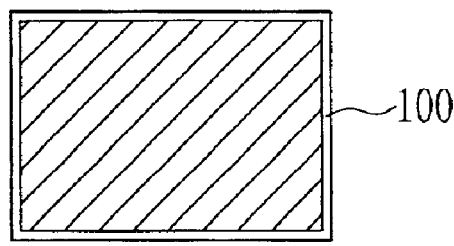
FIGS. 9A, 9B, 9C, 9D, 9E and 9F are explanatory diagrams illustrating examples of templates available in an album mounting mode.
Figure 9B:
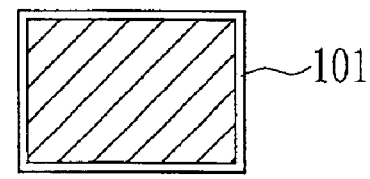
Figure 9C:
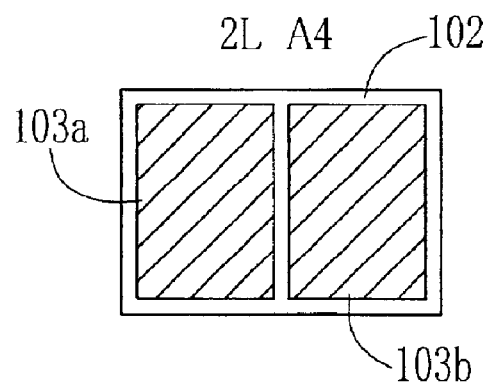
Figure 9D:
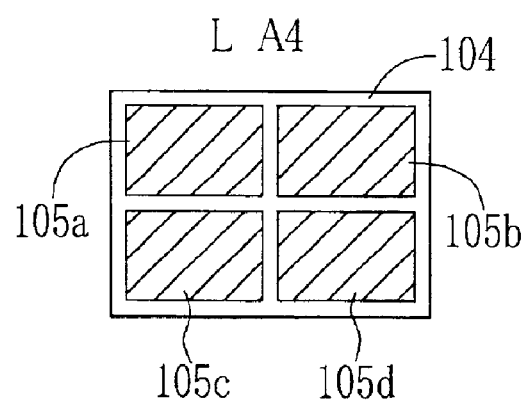
Figure 9E:
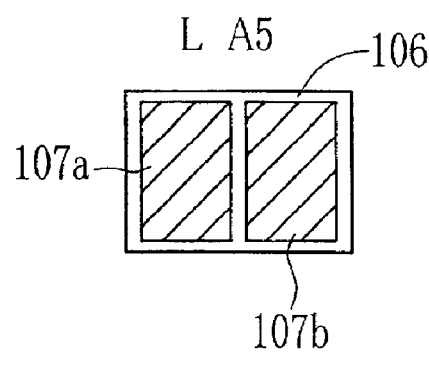
Figure 9F:
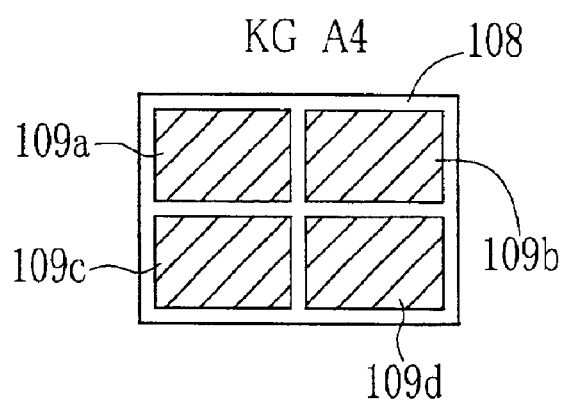

As shown in FIGS. 9A and 9B, a single frame is printed on the almost entire area of a A4 size sheet 100 when the option "A4 1 Frame" is selected, and a single frame is printed in the almost entire area of a A5 size sheet when the option "A5 1 Frame" is selected. When the option "2L A4" is selected, two L-size frames 103a and 103b are printed on a A4 size sheet 102, as shown in FIG. 9C. When the option "L A4" is selected, four L-size frames 105a, 105b, 105c and 105d are printed on a A4 size sheet 104, as shown in FIG. 9D. The option "L A5" is for printing two L-size frames 107a and 107b on a A5 size sheet 106, and the option "KG A4" is for printing four KG-size frames 109a, 109b, 109c and 109d on a A4 size sheet 108, as shown in FIGS. 9E and 9F. It is to be noted that KG-size is about the size of post card.

Figure 10A:
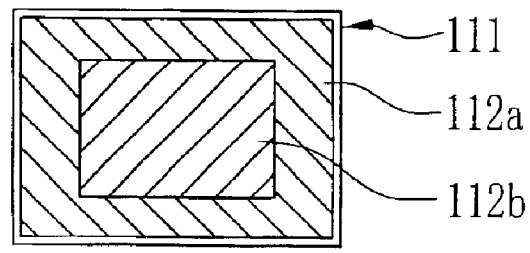
FIGS. 10A, 10B, 10C and 10D are explanatory diagrams illustrating examples of other templates available in an album mounting mode.
Figure 10B:
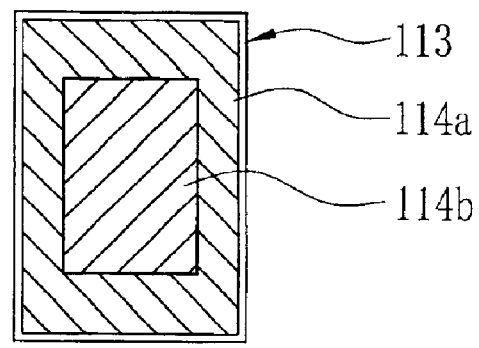
Figure 10C:
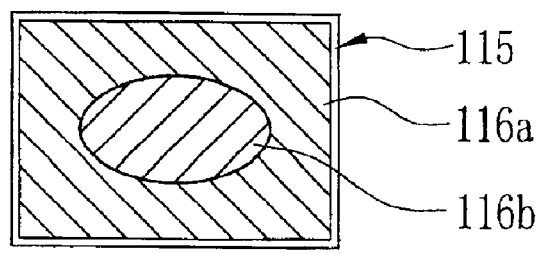
Figure 10D:
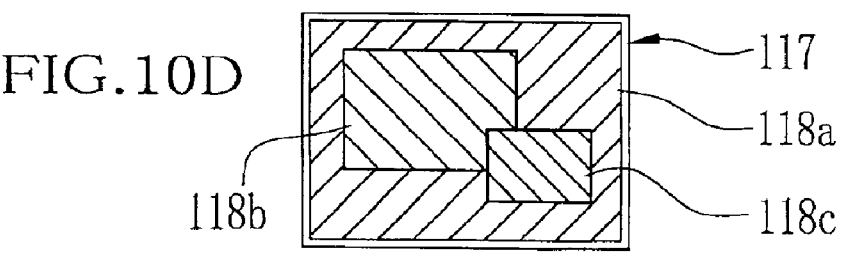

With the template "Superimpose A4 Horizontal", an image is printed as a background image 112a on the almost entire area of a horizontally elongated A4 size sheet 111, and then an image is superimposed as a main image 112b on the background image 112a, as shown in FIG. 10A. With the template "Superimpose A4 Vertical", an image is printed as a background image 114a on the almost entire area of a vertically elongated A4 size sheet 113, and then an image is superimposed as a main image 114b on the background image 114a, as shown in FIG. 10B. The template "Superimpose Oblong A4 Horizontal" is for superimposing an oblong main image 116b on a background image 116a that is printed on the almost entire area of an horizontally elongated A4 size sheet 115, as shown in FIG. 10C. The template "Multi-superimpose A4 Horizontal" is for superimposing a plurality of main images 118b and 118c on a background image 118a that is printed on the almost entire area of an horizontally elongated A4 size sheet 117, as shown in FIG. 10D.

Besides the above templates, there are many other templates for superimposing, for different sizes of recording sheets, including L size, 2L size, A5 size, A5W size and A4W size, and different printing directions.

It is possible to select the template in other ways than the above procedure. For example, it is possible to display samples of the templates on the main display area 37, wherein each sample shows an outline of one template in a reduced size. This configuration permits selecting the template visually by clicking on one of samples, When the recording sheet size and the template are selected on the print size button 80, a crop boundary 84 specific to the selected paper size or the template is displayed on the image 46 to synthesize that has been selected and displayed on the main display area 37, as shown in FIG. 3. The crop boundary 84 is provided with a triangular mark 86 that indicates an upper side of the crop boundary 84. By gripping this mark 84 through the mouse 27, the crop boundary 84 may be moved on the image 46 to synthesize.

When the selected template is for pasting more than one image, i.e. when the framing image 47 consists of a plurality of frames, e.g. the outer frame 47a and the inner frame 47b, the crop boundary 84 has a corresponding shape to one of those frames. That is, by choosing either the outer frame 47a or the inner frame 47b, the crop boundary 84 changes its aspect ratio in accordance with the aspect ratio of the chosen frame 47a or 47b. To indicate the presently chosen frame, the chosen frame is shown by a bold line on the first sub display area 38.

By gripping and dragging any of the four sides or the four corners through the mouse 27, the crop boundary 84 may be changed in size. The crop boundary 84 is normally enlarged or reduced while keeping the same aspect ratio as the chosen frame of the selected template, i.e. the outer frame 47a or the inner frame 47b of the framing image 47 in this instance. After bounding an area of the image 46 with the crop boundary 84 in this way, the pasting button 56 is operated to past the bounded area in the framing image 47 that is previously displayed on the first sub display area 38.

The aspect ratio of the crop boundary 84 may be changed by operating the free cropping button 73. If in that case the crop boundary 84 is horizontally elongated as compared to the aspect ratio of the selected template, the crop boundary 84 is adjusted to the framing image 47 in the horizontal direction. That is, the bounded image area is pasted in the framing image 47 with its left and right sides aligned with the left and right sides of the framing image 47, and blank margins of an equal width are provided on opposite vertical sides of the pasted image. If, on the contrary, the crop boundary 84 is vertically elongated as compared to the aspect ratio of the selected template, the bounded image area is pasted in the framing image 47 with its top and bottom sides aligned with the top and bottom sides of the framing image 47, and with blank margins of an equal width are provided on opposite horizontal sides of the pasted image.

By double-clicking on the first sub display area 38 after changing the aspect ratio of the crop boundary 84, the corresponding frame of the framing image 47 is changed to the new aspect ratio. Thus, the operator can check the balance in position and size between the plurality of frames.

The zoom button 81 is for zooming the image up and down on the main display area 37. The print number button 82 is for designating the number of copies to print. These operation buttons 77 to 82 are each divided into upper and lower halves, and the allocated function is indicated on the lower half, whereas the presently selected option is indicated on the upper half.

The message display area 42 displays messages relating to the presently executed operation or job, information on the operation or the job that can be executed next, or hints for the next operation. The message display area 42 also displays an appropriate error message in case of necessity.

Figure 12:
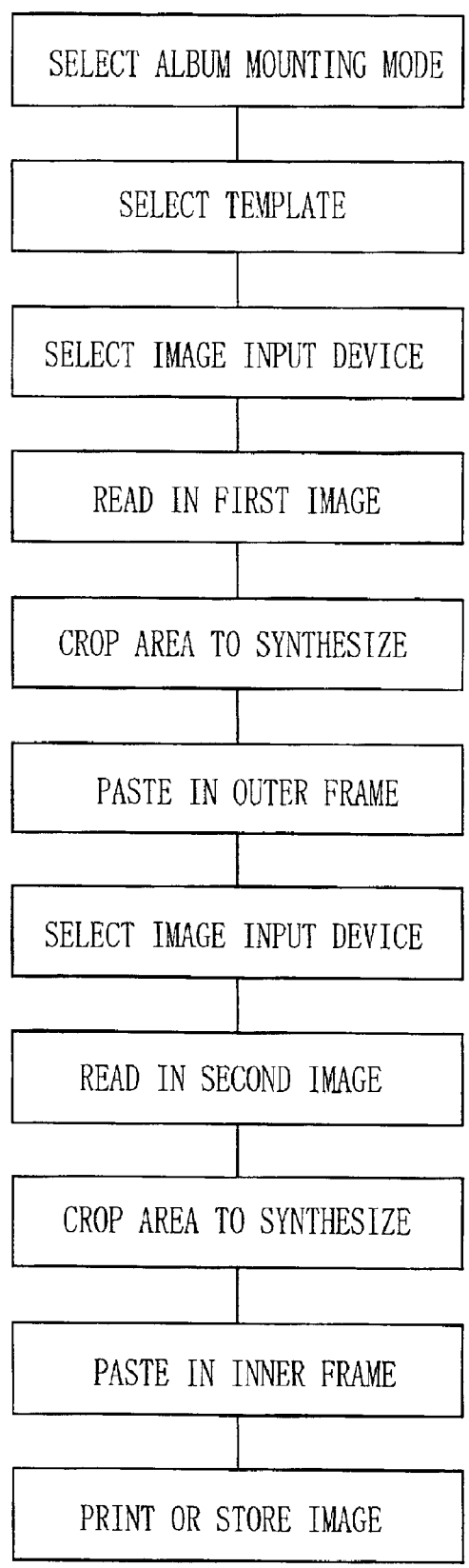
FIG. 12 is a flow chart illustrating a sequence of superimposing in the album mounting mode.

Now the operation of the imaging system 10 of the present embodiment will be described with reference to the flow chart of FIG. 12. The following description will relate to an instance where the album mounting mode is selected, and the template "Superimpose A4 Horizontal" is used for superimposing an main image whose image data is picked up through a digital still camera onto a background image whose image data is read out through the reflective scanner 14.

Upon turning on the imaging system 10, the imaging software is automatically started up in the personal computer 12. At the first stage of starting up the imaging software, any image is not displayed on the main display area 37, the first sub display area 38 and the second sub display area 39 as well.

The operator clicks on the service menu button 77 of the menu selection display area 43 by use of the mouse 27 or the control panel 28, and select one of the menu options listed in the popped up menu list 77a. In this instance, the album mounting mode is selected. Then, the selected mode is displayed on the service menu button 77.

Next, the operator clicks on the input selection button 78 of the menu selection display area 43, to select the kind of the original to scan or the input device from among the options listed in the popped up list. If for example the photo-print is selected, the reflective scanner 14 is automatically selected as the suitable image input device for reading out an image from the photo-print.

When the reflective scanner 14 is selected by the input selection button 78, the input size button 79 gets effective. With the input size button 79, the scanning area to scan by the reflective scanner 14, that is, the size of the reflective original is designated.

The print size button 80 of the menu selection display area 43 is operated for selecting the print size and the template. Upon clicking on the print size button 80, the list 80a of available templates is displayed, as shown in FIG. 8. In this instance, the template "Superimpose A4 Horizontal" is selected, where a main image is superimposed on a background image that is printed on the almost entire area of a horizontally elongated A4 size recording sheet, as shown in FIG. 10A. Instead of the list 80a, template samples illustrating the outlines of the templates may be displayed on the main display area 37.

When the template is selected, the framing image 47 corresponding to the selected template is displayed on the first sub display area 38. If the selected template has a plurality of frames, one of the frames is shown by the bold line to indicate the first frame in which an image is to be pasted first. In this instance, the framing image 47 consisting of the outer frame 47a for the background image and the inner frame 47b for the main image is displayed in the first sub display area 38, and the outer frame 47a is shown by a bold line.

Thereafter, a photo-print containing the image to scan is placed in the reflective scanner 14. Since the reflective scanner 14 is of the flat head type in the present embodiment, the photo-print is positioned on a stage of the reflective scanner 14, and is held flat and fixed in this position by closing a cover to sandwich the original between the stage and the cover.

When the read-in button 55 of the main control command display area 40 is operated after placing the reflective original in the reflective scanner 14, the personal computer 12 drives the reflective scanner 14 to read the image of the photo-print, and output image data of the read image to the personal computer 12 through the SCSI interface 30, and is sent to the image processing section 23 having the color correction circuit and the gradation processing circuit.

In the image processing section 23, the color correction circuit controls the color balance of the input image, taking different spectral characteristics of the reflective scanner 14, by carrying out γ-correction on red, green and blue (RGB) color signals of the image data with correction coefficients that are predetermined for the reflective scanner 14. The gradation processing circuit corrects gradation of the image data by use of the look-up tables (LUT) which are prepared for the respective color materials read out through the reflective scanner 14, such that the gradation is well reproduced by the printer 16.

On the basis of the image data read out through the reflective scanner 14 and processed through the image processing section 23, the image 46 to synthesize first is displayed in the main display area 37 on the control screen 35. Simultaneously, the crop boundary 84 is displayed on the image 46 in the same aspect ratio as the outer frame 47a. Image quality of the image 46 as displayed on the main display area 37 may be controlled by operating the control buttons and sliders on the image quality control area 41.

Then the operator may move the crop boundary 84 on the image 46 or enlarge or reduce the crop boundary 84, to designate an area of the image 46 to paste in the outer frame 47a, wherein the aspect ratio of the crop boundary 84 is maintained unchanged from the same aspect ratio as the outer frame 47a.

When the pasting button 56 of the main control command display area 40 is operated after the cropping area is designated, the reflective scanner 14 scans the photo-print in the fine scanning mode, i.e. at the high resolution. In the fine scanning mode, the CPU 18 automatically sets the scanning resolution of the reflective scanner 14 or the film scanner 15 to make the image resolution in the printing range on the recording sheet equal to the output resolution of the printer 16.

Image data obtained by the fine scanning is fed to the personal computer 12 through the SCSI interface 30, and is input in the image processing section 23. The image processing section 23 corrects the image data on the basis of the image correction parameters obtained through the pre-scanning or entered manually after the pre-scanning. The corrected image data is fed to the image synthesizing section 24.

The image synthesizing section 24 crops out an image of the area of the image 46 that is bounded by the crop boundary 84, and pastes the cropped image in the outer frame 47a of the selected template. Thereby, the cropped image is displayed in the outer frame 47a of the framing image 47 on the first sub display area 38, as shown in FIG. 6. It is to be noted that the image quality may be corrected even after the image is pasted in the template.

After the background image is thus cropped and pasted in the outer frame 47a, the inner frame 47b is automatically selected and changed to be the bold line in the first sub display area 38. Simultaneously, the crop boundary 84 in the main display area 37 is changed to have a size and an aspect ratio that correspond to the inner frame 47b. The inner frame 47b initially has a predetermined size and is located in a standard position concentrated with the outer frame 47a. But the position and the size of the inner frame 47b may be changed by use of the mouse 27. Then, the crop boundary 84 is automatically adjusted to the changed size and position of the inner frame 47b.

In the present embodiment, the image to paste in the inner frame 47b is selected from among those images which are photographed through a digital still camera. So the storage card having image data of these images is set in the card reader 13, and then the input selection button 78 is operated to select the digital still camera. Thereafter when the read-in button 55 is operated, the image data is read out from the storage card into the personal computer 12, so the images photographed through the digital still camera are displayed as thumbnails 48a, 48b and 48c, as shown in FIG. 5.

The operator clicks on the thumbnail of the image to select for pasting, e.g. on the thumbnail 48b in this instance. Then, the selected image is displayed as a second image 88 in a large size on the main display area 37, and the crop boundary 84 corresponding to the inner frame 47b is displayed on the second image 88. It is possible to control the image quality of the second image 88 by use of the control buttons and sliders of the image control area 41, while the second image 88 is displayed on the main display area 37. If the operator already decides the image to select before reading out all the stored images from the storage card, it is possible to designate that image and read out merely image data of that image.

Figure 11:
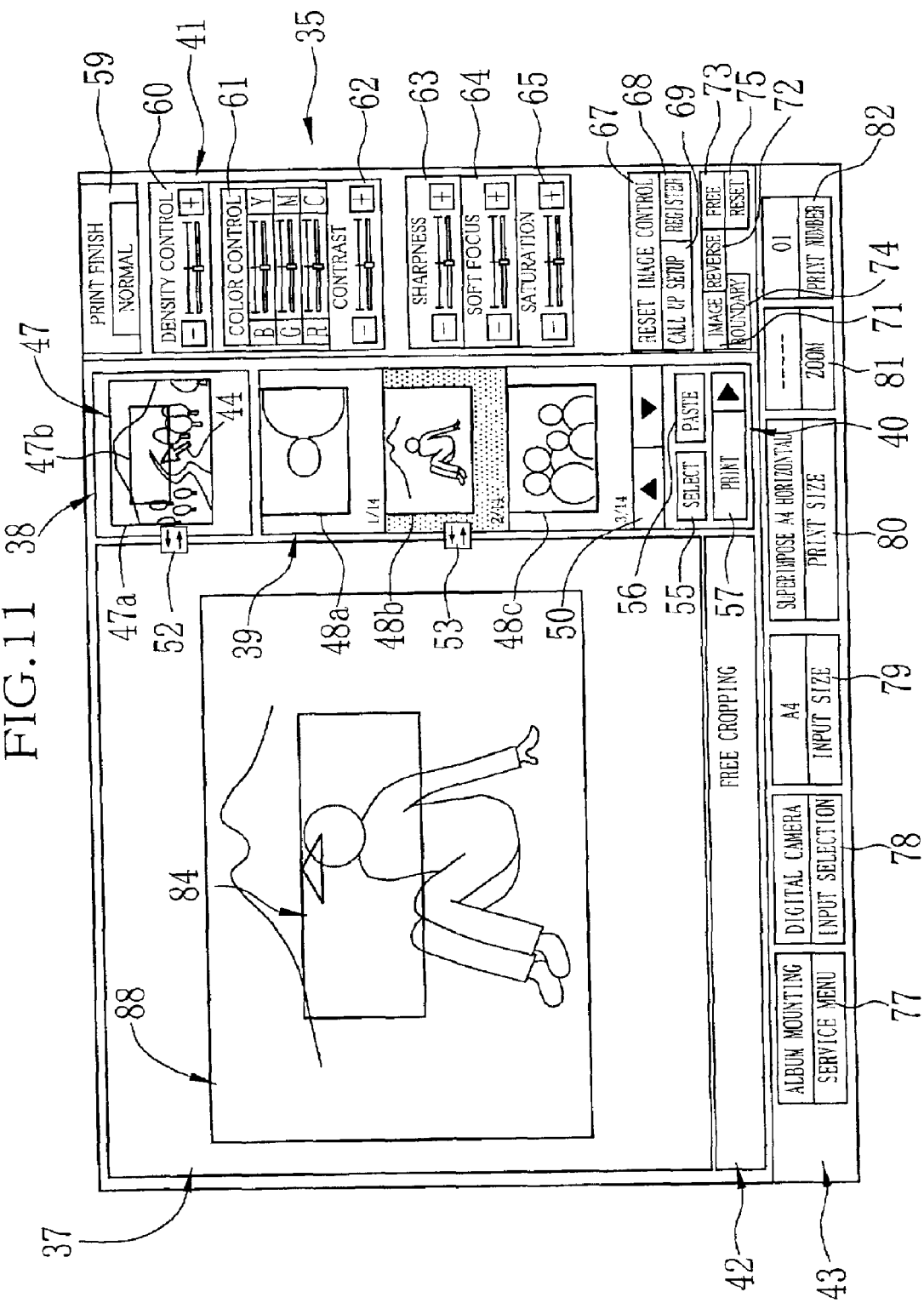
FIG. 11 is an explanatory diagram illustrating an example of display condition on the control screen, when a crop boundary for cropping the second image to synthesize is changed in aspect ratio as well as in size.

The operator may change the position and the size of the crop boundary 84 relative to the second image 88 to designate an area to be pasted in the inner frame 47b. In that case, the crop boundary 84 maintains its aspect ratio while it is enlarged or reduced. However, by operating the free cropping button 73, the aspect ratio of the crop boundary 84 gets changeable by use of the mouse 27, as shown for example in FIG. 11.

When the aspect ratio of the crop boundary 84 is changed, it becomes necessary to adjust the aspect ratio of the inner frame 47b of the framing image 47. Therefore, the operator should shift the pointer 44 to the first sub display area 38 and double-clicks in the first sub display area 38, so the inner frame 47b is changed to the same aspect ratio as the crop boundary 84. Since the aspect ratio of the inner frame 47b is changed while keeping the center of the inner frame 47b unchanged, the center position of the inner frame 47b is not changed relative to the outer frame 47a.

Figure 13:
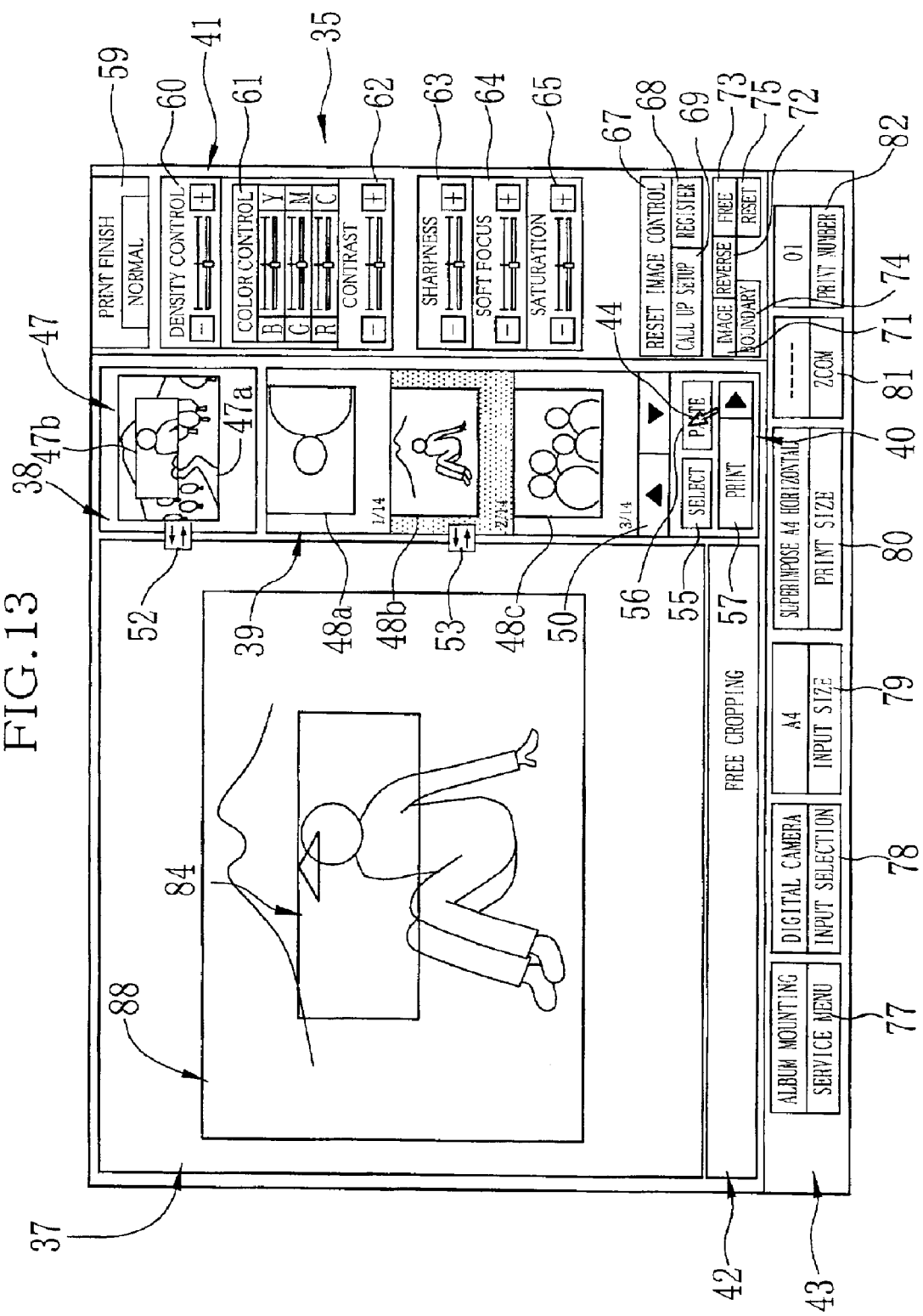
FIG. 13 is an explanatory diagram illustrating an example of display condition on the control screen, when a cropped area of the second image is pasted in an inner frame.

After the cropping area of the second image 88 is designated in this way, the pasting button 56 of the main control command display area 40 is operated to enter the image data of the second image 88 in the image synthesizing section 24. Then the image synthesizing section 24 extracts image data of the cropping area of the second image 88 that is bounded by the crop boundary 84, and paste it in the inner frame 47b. In result, the image cropped out from the second image 88 is pasted in the inner frame 47b of the framing image 47 also on the first sub display area 38, as shown in FIG. 13.

If there is a difference in image resolution between the background image and the main image, the image of the lower resolution looks still more rough and inferior. This is impermissible especially when the resolution of the main image is lower than that of the background image. For this reason, the resolution of the main image to be pasted in the inner frame 47b is changed to be equal to that of the background image as pasted in the outer frame 47a, prior to the pasting of the main image. It is also preferable to make the resolution of the main image slightly higher than that of the background image.

When the operator wants to change either the background image or the main image after they are pasted in the outer and inner frames 47a and 47b, the operator selects the frame in which the image to be changed has been pasted, by clicking on the frame in the first sub display area 38, and then selects or inputs another image to have that image displayed on the main display area 37. Thereafter, a cropping area of the new image is designated by the crop boundary 84, and the pasting button 56 is operated, in the same way as described above. Thereby, a newly cropped image is pasted in the selected frame in place of the previously pasted image.

Figure 14:
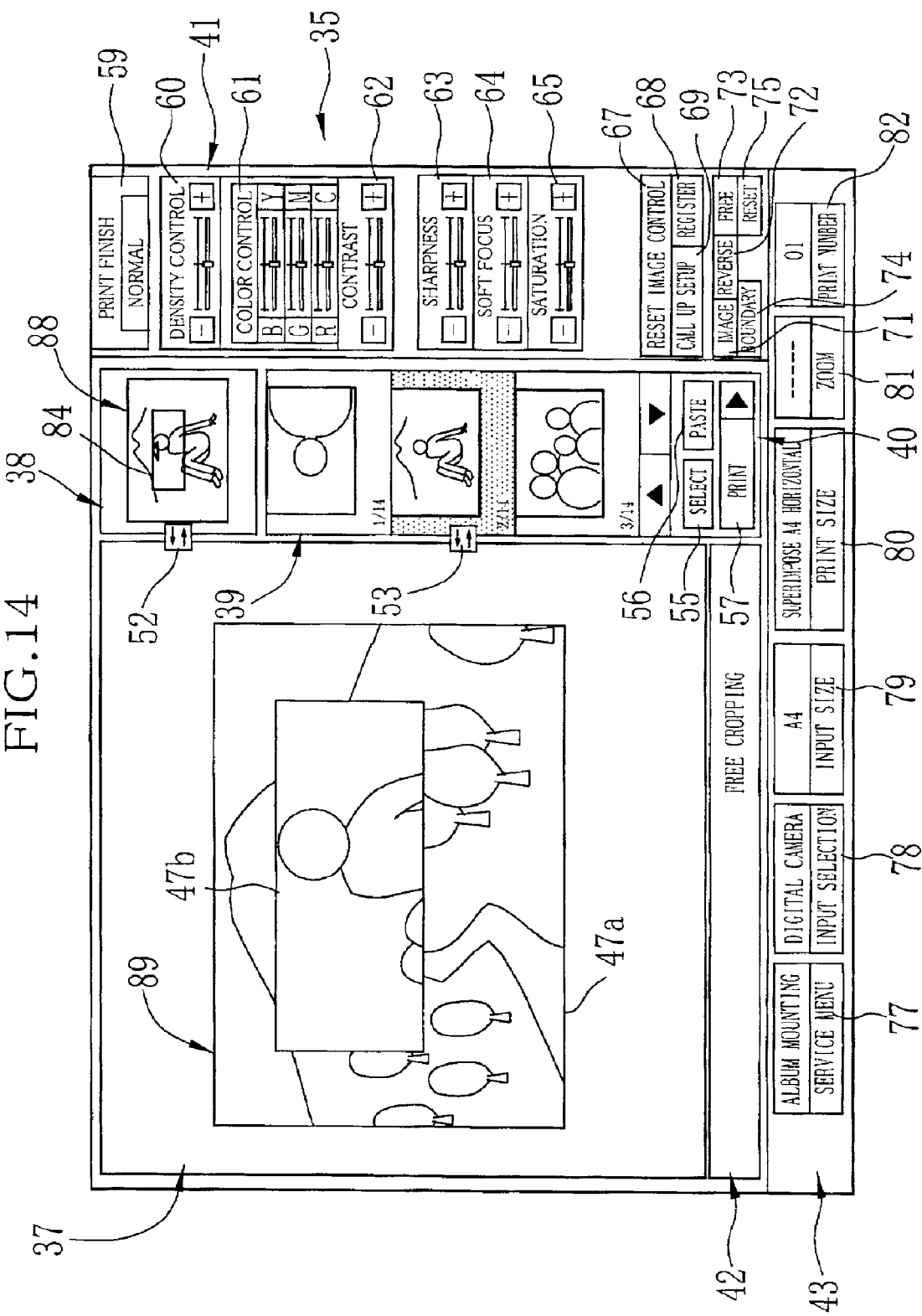
FIG. 14 is an explanatory diagram illustrating an example of display condition on the control screen, wherein the display contents are interchanged between a main display area and a first sub display area of the control screen.

After finishing synthesizing the images, it is possible to check the subsequent synthetic image 89 in an enlarged size by displaying it in the main display area 37, as shown in FIG. 14. For this purpose, the first display interchange button 52 is operated to interchange the display contents between the main display area 37 and the first sub display area 38. The display interchange operation between the main display area 37 and the first or the second sub display area 38 or 39 may also be carried out at appropriate timing during the image synthesizing.

It is possible to change the position or the size of the inner frame 47b relative to the outer frame 47a even after the synthetic image 89 is produced. When the size of the inner frame 47b is changed, the aspect ratio is maintained unchanged, so the image pasted in the inner frame 47b will not be deformed or cut away.

Figure 15:
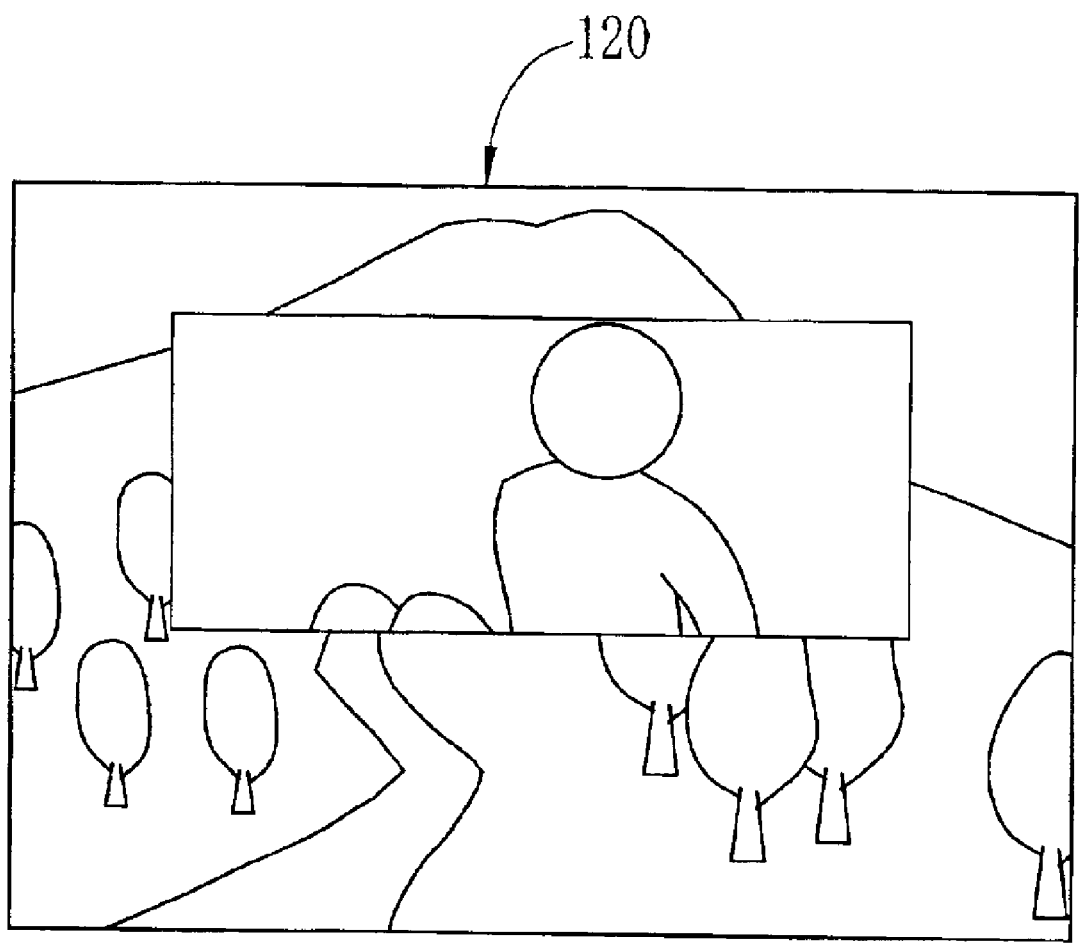
FIG. 15 is an explanatory diagram illustrating a hard copy of a synthetic image produced by the superimposing in the album mounting mode.

The finished synthetic image 89 may be printed out by operating the print button 57 of the main control command display area 40. Upon the print button 57 being operated, the image data written on the RAM 20 is fed to the printer 16, so the printer 16 converts the image data into print data. Since the printer 16 is for the heat-developing photosensitive material in this embodiment, the printer 16 prints the synthesized image 89 by projecting three-color laser beams onto a heat-developing photosensitive material. Thereafter the heat-developing photosensitive material having the image recorded thereon is laid on a photoreceptive material added with water, and is heated together, to form the recorded image as a positive image on the photoreceptive material. The photosensitive material is removed from the photoreceptive material, and the photoreceptive material having the positive image printed thereon is ejected as a hard copy 120 of the synthesized image 89 from the printer 16, as shown in FIG. 15.

It is possible to store image data of the synthetic image 89 in the batch processing holder 21a of the HDD 21 without printing a hard copy of the synthetic image 89 for the present. The synthetic image 89 is stored as a holder 90 in the batch processing holder 21a, and a holder name, e.g. "Superimpose-1", is assigned to the holder 90. In the holder 90, image data of the image pasted in the outer frame 47a is stored as an outer frame image file 90a, and image data of the image pasted in the inner frame 47b is stored as an inner frame image file 90b, whereas location data representative of the position of the inner frame 47b relative to the outer frame 47a is stored as a data file 90c.

When the holder 90 is opened afterward, the synthetic image 89 is reproduced on the basis of the outer frame image file 90a, the inner frame image file 90b and the data file 90c, and displayed in the main display area 37 on the control screen 35. Since the outer frame image or background image and the inner frame image or main image are stored separately from each other, it is possible to change the position or the size of the inner frame 47b again before printing.

It is also possible to make the image data of the synthetic image 89 available to other imaging system that is connected to the imaging system 10 through the LAN or the Internet, by storing it in the shared holder 21b of the HDD 21. To store the synthetic image 89 in the shared holder 21b, the inner frame image is merged in the outer frame image to store as a single synthetic image file 92.

Figure 16:
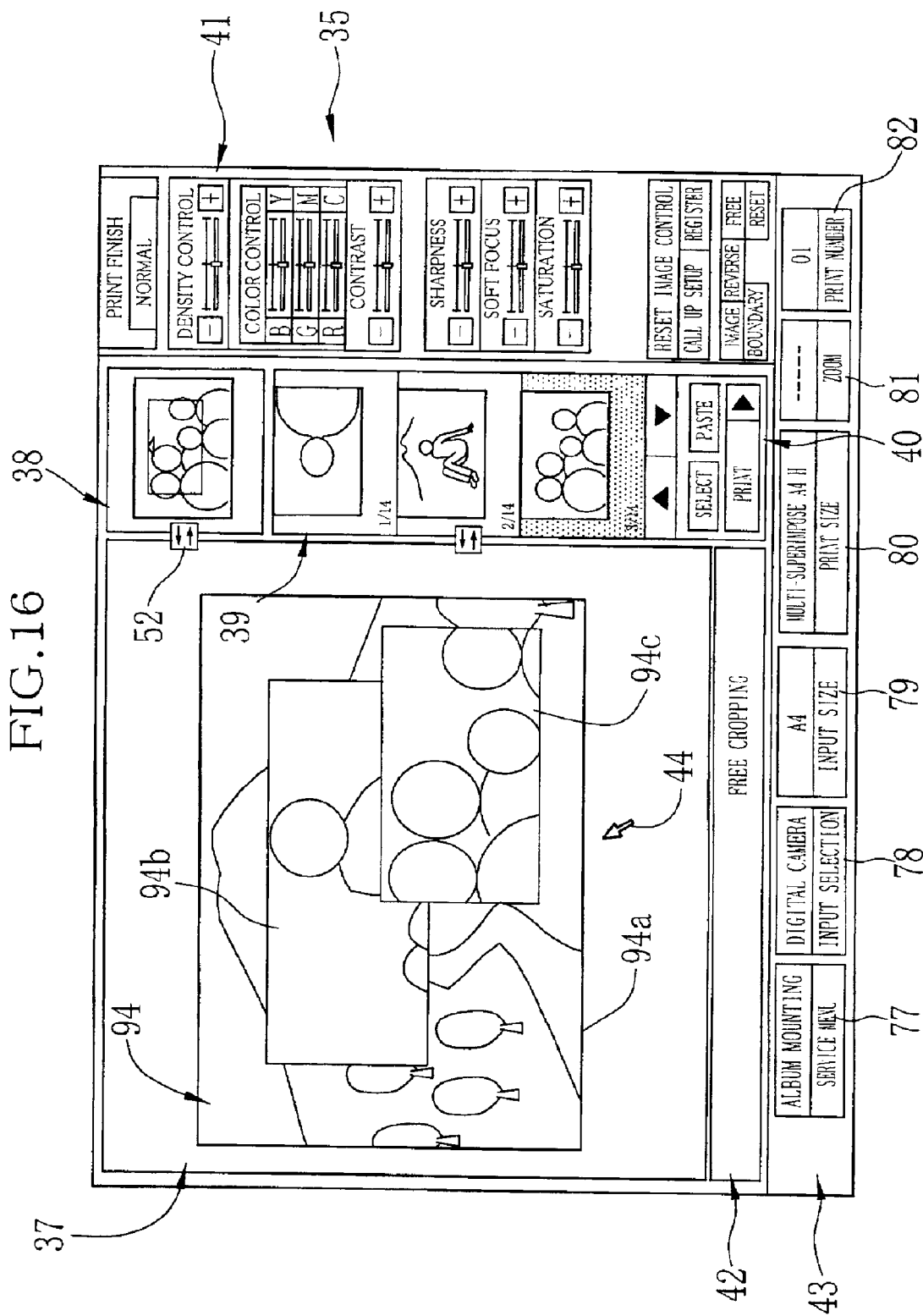
FIG. 16 is an explanatory diagram illustrating an example of display condition on the control screen, wherein a template with a couple of inner frames is selected for superimposing.

Although the present embodiment has been described so far with respect to the case where a main image is superimposed on a background image, if there are a plurality of main images to be superimposed on the background image, e.g. where the template "Multi-superimpose A4 Horizontal" as shown in FIG. 10D is selected, a second main image is cropped and pasted in a second inner frame 94c, as shown for example in FIG. 16, after a background image is cropped and pasted in an outer frame 94a, and then a first main image is cropped and pasted in a first inner frame 94b in the same way as described above. Although the respective frames of the framing image 94a to 94c are initially displayed in the first sub display area 38, FIG. 16 shows a condition where the display contents are interchanged between the main display area 37 and the first sub display area 38, in order to illustrate the framing image of this instance in a large size.

Where there are a plurality of inner frames which overlap with each other, the lately pasted image is usually displayed and printed in front of the previously pasted image. However, which of the inner frame images is to be placed forward may be modified appropriately.

When a synthetic image 94 having a plurality of main images which overlap with each other is stored in the batch processing holder 21a, data showing the sequence of arrangement of the main images from the front should be allocated to the image data. It is preferable to store the sequence data along with the location data that represents the positions of the inner frames relative to the outer frame.

Figure 17:
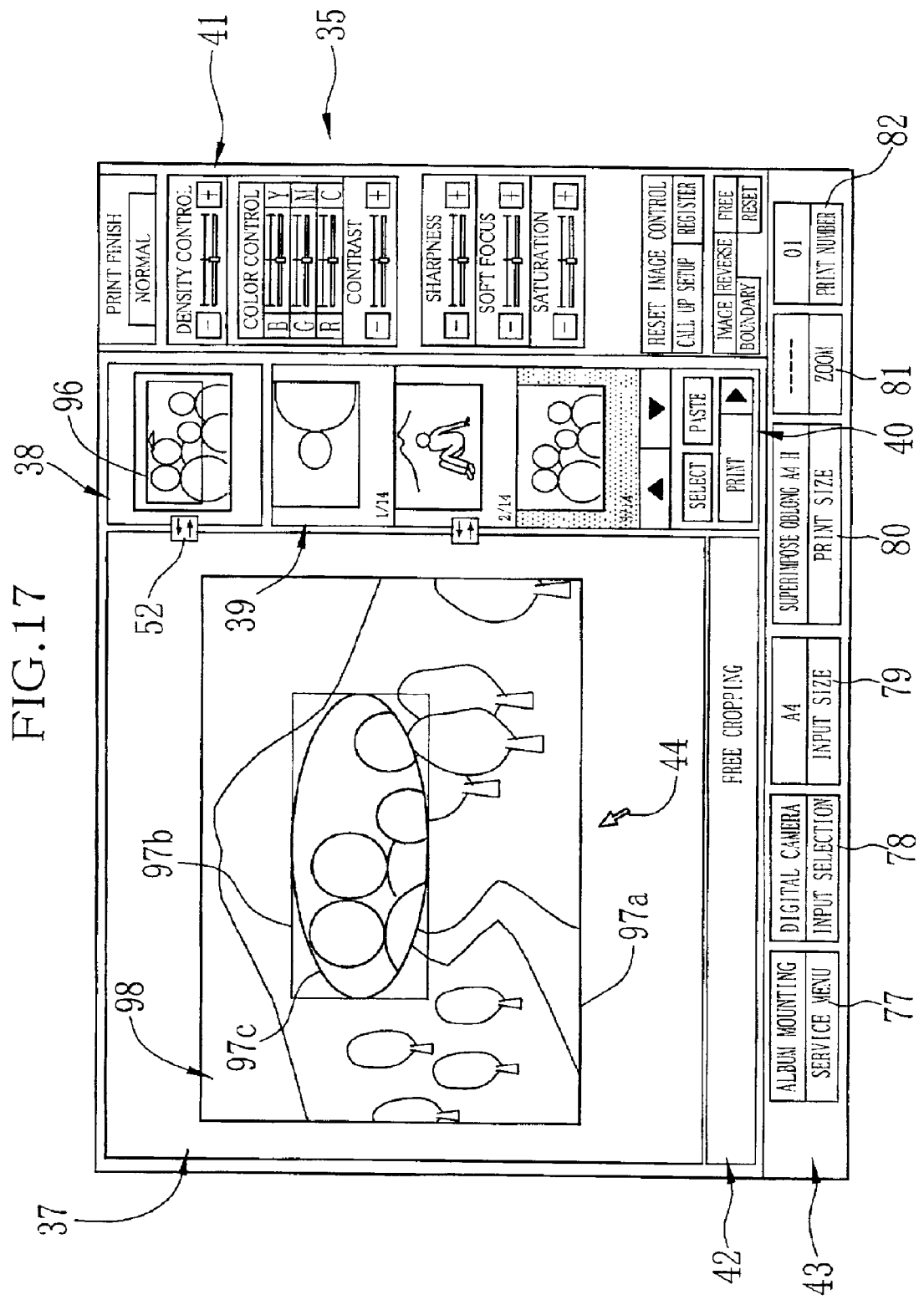
FIG. 17 is an explanatory diagram illustrating an example of display condition on the control screen, wherein a template with an oblong inner frame is selected for superimposing.

To paste a main image in an oblong inner frame, the template as shown in FIG. 10C is selected by operating the print size button 80. Then, a framing image consisting of an outer frame 97a, an inner frame 97b and an oblong trimming frame 97c is displayed on the control screen 35, as shown in FIG. 17, wherein the inner frame 97b circumscribes the oblong trimming frame 97c. Although the respective frames of the framing image 97a to 97c are initially displayed in the first sub display area 38, FIG. 17 shows a condition where the display contents are interchanged between the main display area 37 and the first sub display area 38, in order to illustrate the framing image of this instance in detail in a large size.

After a background image is cropped and pasted in the outer frame 97a in the same way as described with respect to the above embodiment, an image to superimpose is selected and displayed in the main display area 37, and a crop boundary 96 corresponding to the inner frame 97b is displayed on the selected image. When an area is bounded by the crop boundary 96, image data of the bounded area is extracted, to paste a cropped image in the inner frame 97b of the framing image. Of the image data of the bounded area, pixels of marginal portions that are not included in the oblong trimming frame 97c are deleted or converted into transparent pixels, so that the background image is displayed and printed in these marginal portions. Thus, a synthetic image 98 having an oblong main image on the background image is produced.

It is possible to paste the background image as an oblong image in the outer frame in the same way as for the inner frame. Beside the oblong trimming frame, the inner frame or the outer frame may be of a round shape, a triangular shape, a star-like shape, a lozenge shape, a heart shape, or a polygonal shape, e.g. a pentagonal shape or a hexagonal shape.

The above described superimposing is applicable to duplicating a commemorative photograph, e.g. a photograph taken in commemoration of a marriage, where a photo-print is put on a cardboard mount. In that case, the entire area of the mount including the photo-print is scanned by the reflective scanner 14, and the scanned image is pasted in an outer frame. Thereafter, an area corresponding to the photo-print is cropped out from the scanned image, and is pasted in an inner frame whose size and position relative to the outer frame correspond to the size and position of the photo-print relative to the mount. It is desirable to crop the image of the photo-print slightly inside the fringes of the photo-print because the gap between the photo-print and the mount can be detected as shadows in the scanned image.

In the above embodiment, the image to synthesize is selected after the template is selected. But it is also possible to select the image to synthesize before selecting the template. In that case, the image to synthesize is displayed first. Thereafter when the template is selected, the crop boundary is displayed on the image to synthesize.

As the file reader, CD-ROM drive, MO disc drive and other large capacity data storage devices are usable besides the floppy disc drive.

The printer may be digital printers for use with ordinary silver halide photosensitive materials, ink-jet printers, color thermal printers, electronic photography type printer or other printers operating on image signals.

Thus, the present invention is not to be limited to the above embodiment but, on the contrary, various modifications will be possible to those skilled in the art without departing from the scope of claims appended hereto.

What is claimed is:

1. An image synthesizing apparatus for producing a synthetic image from at least first and second images, wherein the synthetic image consists of a background image and at least a main image superimposed on the background image, said apparatus comprising:

a first display section for displaying said at least first and second images one by one in large magnification upon each of said images being selected from among images input in said image synthesizing apparatus;

a second display section for displaying an outer frame and at least an inner frame located inside said outer frame in small magnification;

a frame selecting device for selecting one of said outer and inner frames as displayed in said second display section;

a crop boundary displayed on said image in said first display section, said crop boundary having a similar shape to the frame that is selected by said frame selecting device;

a frame modifying device for modifying any of said outer and inner frames by homothetically changing size or position of said crop boundary relative to the image displayed in said first display section; and a cropping and pasting device for cropping areas of said first and second images that are each individually bounded by said crop boundary, and pasting the cropped area of said first image as the background image in said outer frame, and the cropped area of said second image as the main image in said inner frame;

wherein said synthetic image synthesized by said cropping and pasting device is displayed on said second display section with said outer frame and said inner frame, sizes of a part of said first image and a part of said second image which constitute said synthetic image being smaller than those sizes displayed on said first display section.

2. An image synthesizing apparatus as recited in claim 1, wherein said outer and inner frames are rectangular, and said image synthesizing apparatus further comprises a device for enabling changing aspect ratio of any of said outer and inner frames.

3. An image synthesizing apparatus as recited in claim 1, wherein where the synthetic image is to have a plurality of main images which overlap with each other, data designating an order of displaying a plurality of inner frames from the front of the synthetic image is allocated to each inner frame.

4. An image synthesizing apparatus as recited in claim 3, wherein among the plurality of inner frames, one having an image pasted later is placed forward.

5. An image synthesizing apparatus as recited in claim 3, wherein the order of arrangement of said inner frames from the front of the synthetic image may be modified appropriately.

6. An image synthesizing apparatus as recited in claim 1, wherein said frame selecting device automatically selects said outer frame immediately after said outer and inner frames are displayed in said second display section.

7. An image synthesizing apparatus as recited in claim 1, wherein said frame modifying device may modify the position or the size of any of said outer and inner frames even after an image is pasted in said outer frame or said inner frame.

8. An image synthesizing apparatus as recited in claim 1, further comprising an image quality control device for controlling quality of an image before or after said image is pasted in said outer frame or said inner frame.

9. An image synthesizing apparatus as recited in claim 1, wherein where the main image is to have a non-rectangular contour, a trimming frame of a non-rectangular contour is displayed inside said inner frame, said inner frame having a rectangular shape that circumscribes said trimming frame, and an area having a similar shape to said inner frame is cropped out from said second image, and pasted in said inner frame after pixels of marginal portions of said cropped area which are outside said trimming frame are deleted or converted into transparent pixels.

10. An image synthesizing apparatus as recited in claim 1, further comprising a memory for storing the synthetic image as a set of image data of those images pasted in said outer and inner frames, and location data representative of position of said inner frame relative to said outer frame.

11. An image synthesizing apparatus as recited in claim 10, wherein where the synthetic image has a plurality of main images which overlap with each other, data indicating the sequence of arrangement of the main images from the front of the synthetic image is stored in addition to said location data.

12. An image synthesizing apparatus as recited in claim 1, wherein another image may be pasted in any of said outer and inner frames in place of a previously pasted image.

13. An image synthesizing apparatus as recited in claim 1, further comprising a memory for storing the synthetic image as a single image data file.

14. An image synthesizing apparatus as recited in claim 1, further comprising a template selecting device for selecting a template from among a plurality of options, wherein said outer and inner frames are determined by the selected template.

15. An image synthesizing apparatus as recited in claim 14, wherein samples of said plurality of template options are displayed in a small size on said control screen before one of the templates is selected.

16. An image synthesizing apparatus as recited in claim 1, wherein said first and second display sections are arranged side by side on a same control screen.

17. An image synthesizing apparatus as recited in claim 16, wherein an operating section for operating said image synthesizing apparatus is displayed on the same control screen as said first and second display section.

18. An image synthesizing apparatus as recited in claim 1, wherein the inner frame has one of a round shape, a triangular shape, a star shape, and a heart shape.

19. An image synthesizing apparatus as recited in claim 1, wherein the outer frame has one of a round shape, a triangular shape, a star shape, and a heart shape.

20. An image synthesizing apparatus as recited in claim 1, wherein a resolution of the main image is slightly higher than a resolution of the background image.

21. An image synthesizing apparatus as recited in claim 1, wherein the outer frame circumscribes the inner frame in the second display section.

22. An image synthesizing apparatus as recited in claim 21, wherein the frame modifying device operably modifies each of the outer and inner frames.

* * * * *